(12) United States Patent
Johnson

(10) Patent No.: US 8,112,963 B2
(45) Date of Patent: Feb. 14, 2012

(54) DECORATIVE ACCESSORY

(76) Inventor: Aubren M. Johnson, Highland, UT (US)

( * ) Notice: Subject to any disclaimer, the term of this patent is extended or adjusted under 35 U.S.C. 154(b) by 785 days.

(21) Appl. No.: 12/146,091

(22) Filed: Jun. 25, 2008

(65) Prior Publication Data

US 2009/0324880 A1 Dec. 31, 2009

(51) Int. Cl.
*B32B 3/10* (2006.01)

(52) U.S. Cl. ........... 52/698; 52/700; 52/701; 52/703; 52/713; 63/33

(58) Field of Classification Search ............ 428/57, 428/53; 52/698, 700, 701, 703, 713; 63/33
See application file for complete search history.

(56) References Cited

U.S. PATENT DOCUMENTS

| | | | |
|---|---|---|---|
| 645,307 A | 3/1900 | Allen | |
| 1,658,955 A | 2/1928 | Waldes | |
| 1,711,031 A | 4/1929 | Richards | |
| 2,172,132 A | 9/1939 | Schneible | |
| 2,887,795 A | 5/1959 | Taicher | |
| 3,179,954 A | 4/1965 | Weitzner | |
| 3,233,801 A | 2/1966 | Schulenberg | |
| 3,502,396 A | 3/1970 | Greenberg | |
| 3,528,079 A | 9/1970 | Birch | |
| 3,551,963 A | 1/1971 | Mosher, Jr. et al. | |
| 3,601,909 A | 8/1971 | Amendola | |
| 3,708,804 A | 1/1973 | Santos | |
| 3,849,839 A | 11/1974 | Zimber | |
| 4,639,948 A | 2/1987 | Adell | |
| 4,712,319 A | 12/1987 | Goria | |
| 4,936,699 A | 6/1990 | Yoshida | |
| 5,161,390 A * | 11/1992 | Sam ................................. 63/12 |
| D344,624 S | 3/1994 | Schnel et al. | |
| 5,673,501 A | 10/1997 | Mathews | |
| 5,785,065 A | 7/1998 | Johnson | |
| 5,803,266 A | 9/1998 | Blackwelder | |
| 5,901,381 A | 5/1999 | Nelson | |
| 6,422,177 B1 | 7/2002 | Noguero | |
| 6,568,044 B1 | 5/2003 | Kidd | |
| 6,640,464 B2 | 11/2003 | Hsin et al. | |
| 7,178,364 B2 | 2/2007 | Shapiro et al. | |
| D554,847 S | 11/2007 | Schmelzer et al. | |
| 7,698,836 B2 | 4/2010 | Schmelzer et al. | |
| 2006/0007668 A1 | 1/2006 | Chien | |
| 2006/0016218 A1* | 1/2006 | Shapiro et al. ................ 63/39 |
| 2007/0006502 A1 | 1/2007 | Schmelzer et al. | |
| 2007/0094776 A1 | 5/2007 | Stevens et al. | |
| 2008/0060110 A1 | 3/2008 | Schmelzer et al. | |
| 2010/0162591 A1 | 7/2010 | Schmelzer et al. | |

FOREIGN PATENT DOCUMENTS

| | | |
|---|---|---|
| CN | 87200383 | 1/1988 |
| CN | 87205781 | 5/1988 |
| CN | 2177354 | 9/1994 |
| DE | 9421419 | 1/1996 |
| EP | 1498043 | 1/2005 |

* cited by examiner

*Primary Examiner* — Brent Ohern
(74) *Attorney, Agent, or Firm* — Fredrikson & Byron, P.A.

(57) ABSTRACT

A decorative accessory unit, a decorative accessory assemblage, a kit for a personal accessory craft project and a method for creating a personal accessory are described. A plurality of decorative units having at least two linking ends protruding therefrom are provided along with a plurality of connector elements for coupling the linking ends of two decorative units together.

10 Claims, 3 Drawing Sheets

DECORATIVE ACCESSORY

SUMMARY

According to a first aspect of the invention, there is provided a decorative accessory unit including a body and at least two linking ends. The body includes a generally planar material having edges defining a shape and the body having front and rear surfaces. The at least two linking ends protrude from the edges of the body and each linking end includes a stretchable material having at least one connection aperture passing therethrough, each connection aperture configured to receive a connector.

According to a second aspect of the invention, there is provided a decorative accessory assemblage including a plurality of individual and separable decorative units and one or more connector elements. Each unit includes a generally planar, decoratively-shaped body having front and rear surfaces and at least two linking ends protruding from the body, each linking end having at least one connection aperture passing therethrough. The one or more connector elements link each of the individual decorative units to form the assemblage, each connector element being installed within one or more of the connection apertures of a first one of said decorative units and one or more of the connection apertures of a second one of said decorative units, such that the connector elements engage the linking ends of the first and second decorative units.

According to a third aspect of the invention, there is provided a kit for a personal accessory craft project. The kit includes a plurality of decorative accessory units and a plurality of connector elements. Each unit includes a generally planar body having front and rear surfaces and at least two linking ends protruding from the body, each linking end having at least one connection aperture passing therethrough. The plurality of connector elements are installable within one or more of the connection apertures of a first one of said decorative accessory units and one or more of the connection apertures of a second one of said decorative accessory units, such that the connector elements engage the linking ends of the first and second decorative accessory units thereby coupling successive units.

According to a fourth aspect of the invention, there is provided a method of creating a personal accessory. The method includes providing (i) a plurality of decorative accessory units, each decorative accessory unit comprising a generally planar body having front and rear surfaces and at least two linking ends protruding from the body, each linking end having at least one connection aperture passing therethrough, (ii) a plurality of decorative connector elements, and (iii) at least one ornament; selecting at least one of the decorative accessory units; and selecting a number of decorative connector elements, the number being at least as many connectors as necessary to link the selected decorative elements. The method further includes installing at least one of the ornaments in at least one of the selected decorative accessory units; aligning the connection apertures of adjacent linking ends of successive decorative accessory units; linking the successive decorative elements by installing one of the selected decorative connector elements through the aligned connection apertures; and repeating the aligning and linking steps as necessary to link a desired number of decorative accessory units together in a desired order.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE DRAWINGS

Figure 1:
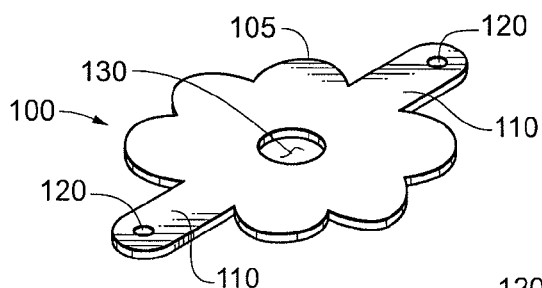
FIG. 1 is a perspective view of a decorative accessory according to one embodiment of the invention.

For the purpose of promoting an understanding of the principles of the invention, reference will now be made to the embodiments illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

As is shown in FIG. 1, embodiments of the invention include a decorative accessory unit 100. The decorative accessory unit 100 includes a body 105 and at least two linking ends 110 protruding from the edges of the body 105. In some embodiments, connectors (such as those in FIGS. 4-7) can be installed through connection apertures 120 in the linking ends 110 to couple two or more decorative accessory units together to form a decorative accessory assemblage 300 (see e.g. FIG. 10A).

Figure 2:
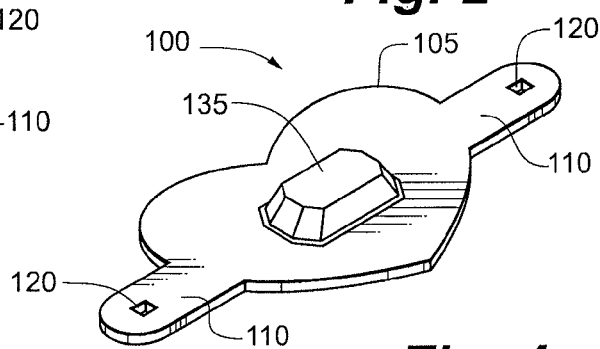
FIG. 2 is a perspective view of a decorative accessory according to one embodiment of the invention.
Figure 3:
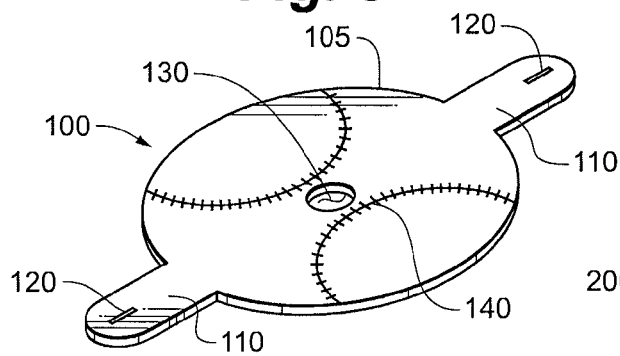
FIG. 3 is a perspective view of a decorative accessory according to one embodiment of the invention.
Figure 4:
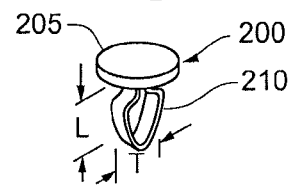
FIG. 4 is a perspective view of a connector according to one embodiment of the invention.
Figure 5:
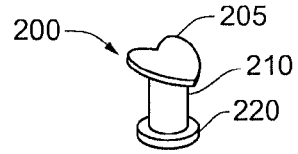
FIG. 5 is a perspective view of a connector according to one embodiment of the invention.

Referring again to FIG. 1, the body 105 of the decorative accessory unit 100 is generally planar with front and rear surfaces and can include a variety of features. Most notably, the body 105 can comprise a variety of shapes. The embodiment of FIG. 1 can be described as having a flower shape. Numerous other shapes can be appropriate for decorative accessory units according to the embodiments of the present invention. For example, the body 105 of FIG. 2 is heart-shaped and the unit 100 of FIG. 3 has a circular body 105. In some embodiments, the body includes an aperture 130 configured to receive an ornament. The aperture 130 can be centrally located relative to the edges of the body 105 or otherwise positioned. For example, the embodiment of FIG. 2, includes an ornament 135 installed through the aperture. The ornament 135 may have a flat surface or it may have a three-dimensional surface as shown in FIG. 2. In addition, some embodiments include a decorative design 140 of the body 105. The design can be printed, etched, painted, or otherwise displayed on one or more surfaces of the body 105. For example the decorative accessory unit 100 of FIG. 3 includes a baseball stitch design 140 printed on its front surface. Also, various visually enhancing elements such as glitter may be used for both the body 105 and the connectors 200 which will be described hereinafter.

At least two linking ends 110 protrude from the body 105 of decorative accessory units 100 according to the invention. In many embodiments, the unit includes two linking ends positioned diametrically opposite each other, however other arrangements and numbers of linking ends are contemplated by the invention, for example, there may be four linking ends, two from the sides, as shown, and one from the top and one from the bottom. Each linking end 110 is a generally planar extension formed of a stretchable material and including one or more connection apertures 120. Connection apertures 120 can be round (see e.g. FIG. 1), square (see e.g. FIG. 2), a slit (see e.g. FIG. 3), or otherwise shaped, so long as the connection aperture 120 is sized to appropriately interact with a connector installed within as discussed below with reference to FIGS. 10A and 10B.

In some embodiments, the body 105 and linking ends 110 comprise the same material. For example, the body 105 and linking ends 110 can both comprise ethylene vinyl acetate (EVA) foam. However, in certain embodiments the body 105 and linking ends 110 comprise different materials. In general, the body 105 comprises a decorative material, such as an injectable soft plastic such as LDPE or PVC. The linking ends 110 comprise a stretchable material such as EVA foam or rubber.

Figure 8A:
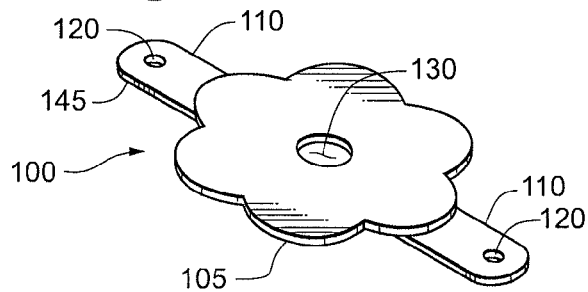
FIG. 8A is perspective view of a decorative accessory unit including a strap according to some embodiments of the invention.
Figure 6:
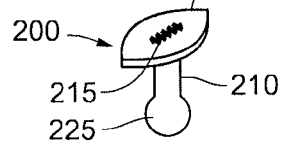
FIG. 6 is a perspective view of a connector according to one embodiment of the invention.
Figure 7:
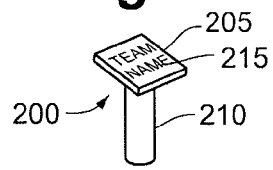
FIG. 7 is a perspective view of a connector according to one embodiment of the invention.
Figure 8B:
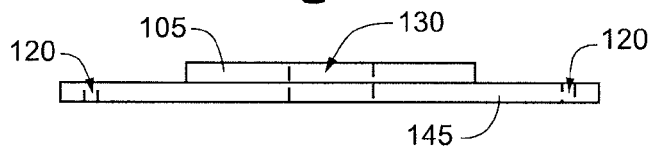
FIG. 8B is a side plan view of a decorative accessory unit including a strap according to some embodiments of the invention.
Figure 8C:
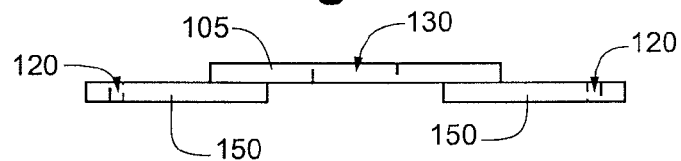
FIG. 8C is a side plan view of a decorative accessory unit including a strap according to some embodiments of the invention.

FIG. 8A shows a perspective view of a decorative accessory unit 100 according to embodiments of the invention including a strap 145. Here, rather than having linking ends integrally formed with or coupled to an edge or side of the body, the linking ends 110 comprise a strap 145 coupled to the rear of the body 105. Such an arrangement may be appropriate where the strap and body comprise different materials. FIGS. 8B and 8C show side plan views of embodiments wherein the linking ends comprise a strap such as that of FIG. 8A. In one (FIG. 8B) the strap 145 comprises a single length of stretchable material operatively coupled to the rear of the body 105. In such an arrangement, aperture 130 can extend through both the body 105 and the strap 145. In the other (FIG. 8C) the strap comprises at least two separate strap segments 150 separately coupled at different locations on the rear surface of the body 105. For example, the strap segments 150 can be coupled diametrically opposite one another relative to a centrally located aperture 130.

Figure 9A:
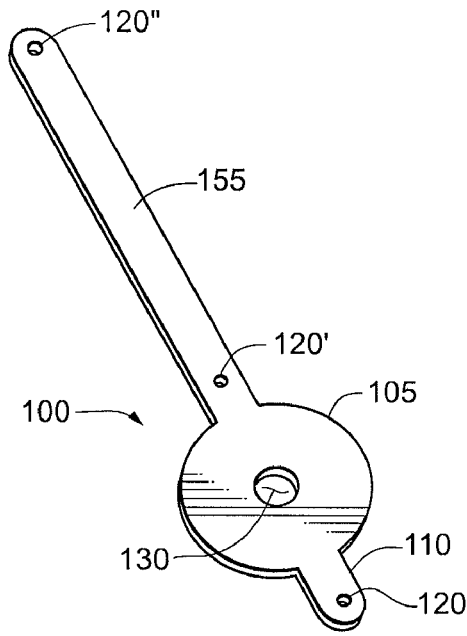
FIG. 9A is a perspective view of a decorative accessory unit including a loopable end, according to some embodiments of the invention.
Figure 9B:
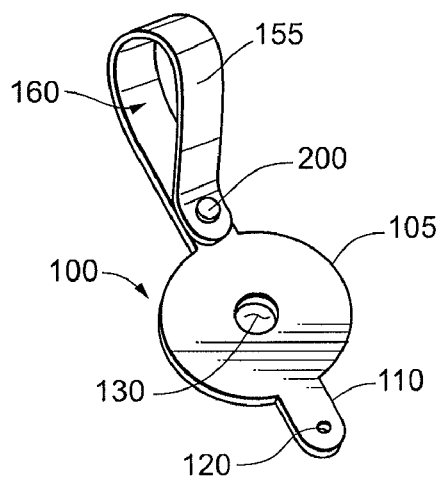
FIG. 9B is a perspective view of a decorative accessory unit including a loopable end formed into a loop, according to some embodiments of the invention.

FIGS. 9A and 9B show embodiments of decorative accessory units 100 including a loopable end 155. In some embodiments, one or more of the linking ends 110 can be a loopable end 155. Loopable ends 155 are generally elongate linking ends having two or more connection apertures 120', 120". The first connection aperture 120' can be located close to the body 105 with the second 120" located at a tip of the loopable end 155. FIG. 9B illustrates how a loopable end can be used to create a loop 160 which can be used to attach the decorative accessory unit 100 or a decorative accessory assemblage including a unit having a loopable end to any number of objects such as a back pack or a belt loop, for example. To create the loop 160, the loopable end 155 has been folded so that the first and second connection apertures 120', 120" are aligned. A connector 200, such as one of the connectors described below, has been installed through the aligned connection apertures. A loopable end 155 can be coupled with the body 105 in the same manner as the linking ends discussed above. For example, a loopable end can be integrally formed with the body (such as e.g. the linking ends of FIG. 1), or can be coupled with a surface of the body (such as e.g. the strap of FIGS. 8A-9B).

Figure 11A:
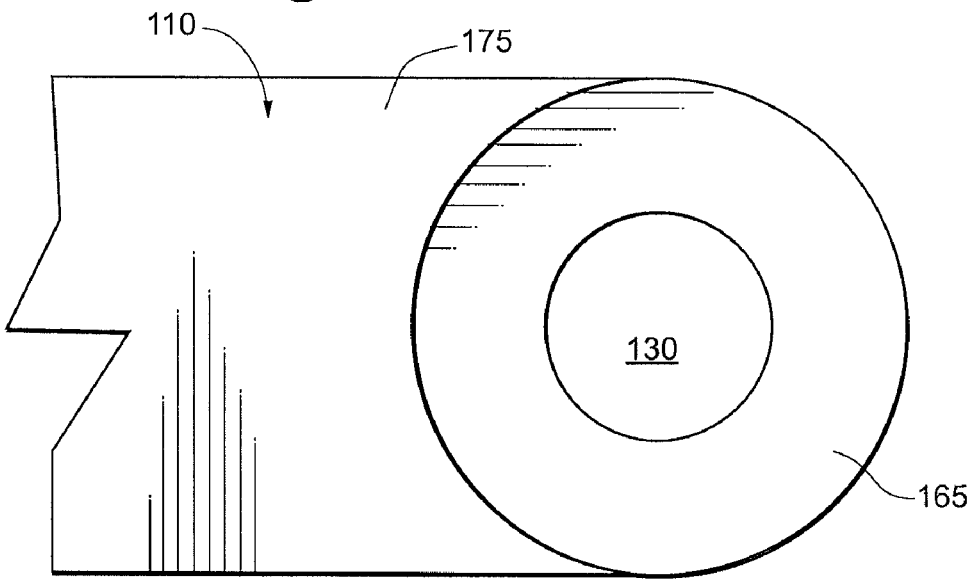
FIG. 11A is a top plan view of a linking end according to some embodiments of the invention.
Figure 11B:
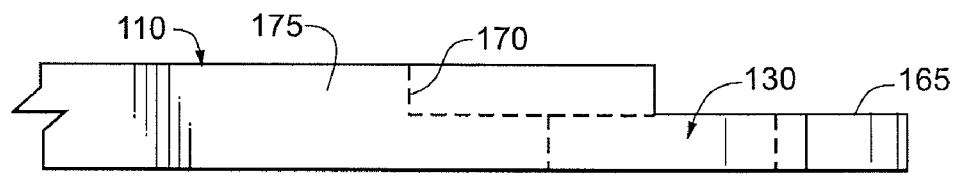
FIG. 11B is a side plan view of the linking end of FIG. 11A.
Figure 11C:
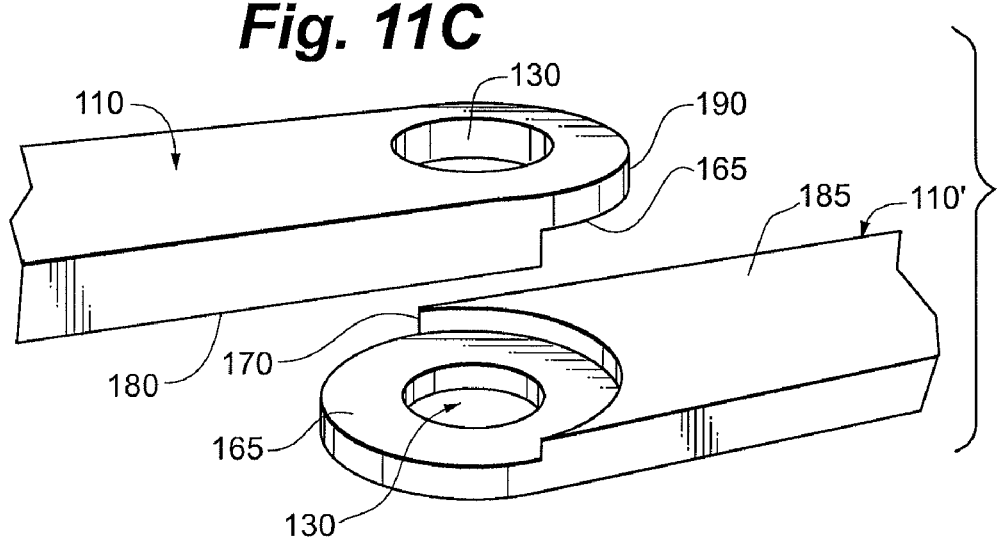
FIG. 11C is a perspective view of linking ends including recessed apertures according to some embodiments of the invention.

Some embodiments can include one or more linking ends having a recessed connection aperture, such as the linking ends 110 shown in FIGS. 11A-11C. In FIG. 11A, the operative end of a linking end 110 having a connection aperture 120 through a recessed surface 165 of the linking end 110. Here, the recessed surface 165 generally defines a circular shape having a diameter larger than that of the connection aperture 120, however other shapes are contemplated. The plan view of FIG. 11B shows a profile view of the linking end 110 of FIG. 11A. Here, the recessed surface 165 is noticeable and a ledge 170 defining the border between the recessed portion 165 and the unrecessed portion 175 can be seen. From this view, it can be seen that the recessed portion 165 retains a thickness of approximately one half that of the unrecessed portion 175. Thus, when embodiments including a recess 165 are aligned and engaged, the resulting connection is flush along the length of the linking element. FIG. 11C shows a perspective view of how linking ends 110, 110' including recess 165 can be connected. Here, one linking end 110 is arranged such that the recessed surface 165 is on the rear surface 180 of the end, and the other 110' is arranged such that the recessed surface 165 is on the front surface 185 of the end. When the linking ends 110, 110' are placed immediately adjacent to one another, the connection apertures 120 can be aligned and the recesses receive each other. One can see that a flush connection can be established if the ledges 170 and operative ends 190 of the coupled linking ends 110, 110' are generally the same thickness. Some decorative accessory units including such recess features can include at least one rearward oriented recess and at least one frontward oriented recess, so that consecutive elements need not be installed upside-down.

Exemplary connectors 200 according to embodiments of the invention are shown in FIGS. 4-7. Each connector generally includes a decorative portion 205 and an engaging portion 210. Connectors 200 should be generally rigid, and can comprise, for example, a plastic, hard rubber, or metal. The decorative portion 205 and engaging portion 210 need not comprise the same material. The connectors 200 can be used to connect successive selected decorative accessory units to form a decorative accessory assemblage. The connectors should provide for relatively simple connections to be formed so that embodiments of the invention are usable as craft projects or accessories for users of a wide range of ages, e.g. from young children to adults. According to some embodiments of the invention, the connectors are decorative and can provide an additional design element to a user creating a decorative assemblage. Thus, rather than using plain connector elements to couple successive accessory units, additional design elements can be injected by using a creative selection of connectors.

The decorative portion 205 of each connector can be a generally planar surface of a variety of standard or custom shapes. For example, decorative portions 205 can be circular (e.g. FIG. 4), heart-shaped (e.g. FIG. 5), football-shaped (e.g. FIG. 6), or rectangular (e.g. FIG. 7), for example. Appropriately sized decorative portions are broad enough so as not to slip through a connection aperture, yet small enough so as not to distract from design features of the decorative accessory unit. For example, a connector's decorative portion can be larger than 0.5 square cm and less than 4 square centimeters (e.g. 1 square cm). In various embodiments, the decorative portion 205 can include design features 215. For example, a relief design or drawing, for example, the stitches 215 on the football shaped connector 200 of FIG. 6. Moreover, a team logo, company name, image, or other design 205 may be printed, etched, engraved, molded, painted, or otherwise displayed on the decorative portion 205 (see e.g. FIG. 7). In addition, the decorative portion 205 can be flat or it may have a three-dimensional shape such as the surface of ornament 135 shown in FIG. 2. The connectors 200 may be provided with light emitting elements and/or sound emitting elements, for example, to further enhance the design and its versatility. Scratch and sniff elements may also be incorporated into the connectors and/or body 105.

The engaging portion 210 of the connectors 200 protrudes from a surface of the decorative portion 205. The engaging portion can be integrally formed of the decorative portion or may be a separate component coupled thereto. Thickness T and length L dimensions of the protrusion should be selected according to properties of the decorative assembly unit(s) in which the connector is to be installed. The thickness T should be slightly greater than the dimension of the connection apertures, and the length L should be slightly longer that the combined thickness of the linking ends to be connected. For example, a connector to be installed in two linking ends each having a thickness of 0.5 cm and connection apertures having a diameter of 0.5 cm should be greater than 1 cm in length (e.g. 1.2 cm) and greater than 0.5 cm thick (e.g. 0.6 cm). Engaging portion 210 can take numerous forms, such as a loop (see e.g. FIG. 4) or a post (see e.g. FIG. 7). In addition, some engaging portions include additional features to secure the connector once installed. These features can include, for example a collar or flange 220 (see e.g. FIG. 5), or a bulb 225 (see e.g. FIG. 6). The type of engaging portion used can depend upon the security/permanence of the connection desired, the connection aperture design and the material of the linking ends. For example, where the connection aperture engages the connector relatively loosely, for example with some circular apertures, it may be desirable to use a connector including an additional securing feature such as a flange.

It should be recognized that the embodiments of FIGS. 4-7 merely represent examples of connectors within the scope of the invention and these examples are by no means meant to be exhaustive. One of ordinary skill will recognize numerous other designs, configurations, and combinations, all of which should be considered within the scope of invention.

Figure 10A:
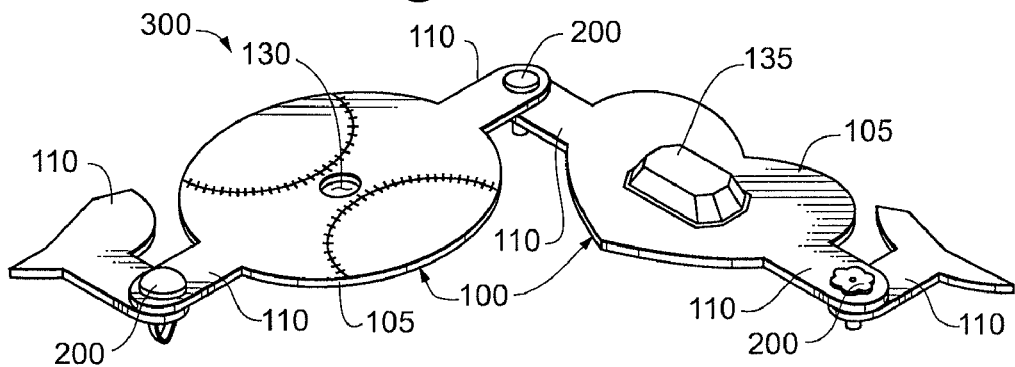
FIG. 10A is a perspective view of a decorative accessory assemblage according to some embodiments of the invention.
Figure 10B:
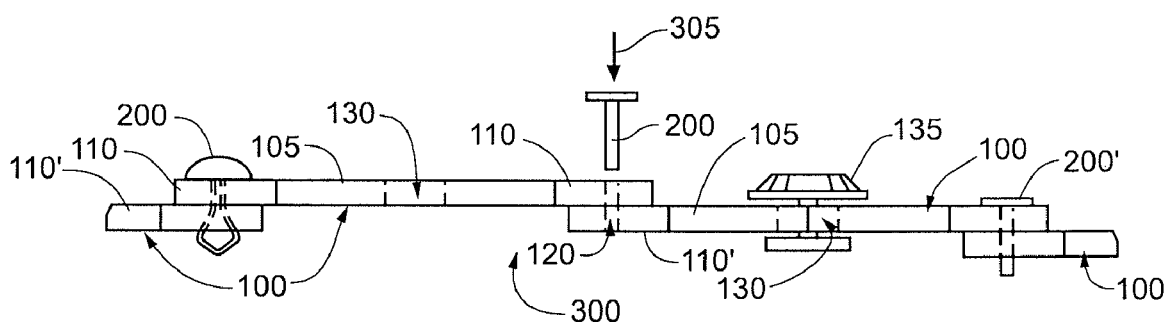
FIG. 10B is a side plan view of a decorative accessory assemblage according to some embodiments of the invention.

FIGS. 10A and 10B show perspective and side plan views, respectively, of a decorative accessory assemblage 300 according to some embodiments of the invention. The assemblage 300 includes a plurality of decorative accessory units 100 the linking ends 110 of which are connected by connectors 200. One or more bodies 105 of the decorative accessory units 100 can include an ornament 135 installed within an aperture 130.

A decorative assemblage 300 can be formed by coupling two or more decorative accessory units 100. To accomplish this, a user can align a connection aperture 120 of a first linking end 110 with a connection aperture of a second linking end 110'. Then, as shown in FIG. 10B, the engaging portion 210 of a connector 200 can be inserted (e.g. by pressing on the decorative portion 205, e.g. along arrow 305) through the aligned connection apertures, causing the stretchable material of the linking end to stretch slightly. When the connector 200 is installed, the apertures attempt to return to their initial state, thereby gripping the connector 200 in place. As can be seen in FIG. 10B the decorative accessory assemblage includes a plurality of individual, flexible decorative units, each unit comprising a generally planar, single decoratively-shaped body having front and rear surfaces and at least two fixed linking ends protruding from the body, each linking end having at least one stretchable connection aperture passing therethrough wherein each aperture for each individual unit lies within the same plane.

Some assemblages can include one or more ornaments 135 installed through an aperture 130 of one or more bodies 105. Ornaments 135 can be installed prior to or after connecting one decorative accessory unit to another. Exemplary ornaments can include Jibbitz™, Snap-Itz™ or Shoe-Doodles™ charms, which are commercially available and have been used as accessories installable within, for example, CROCS™ shoes. Such ornaments can be installed within the aperture 130 much as they would be installed within an aperture of a bracelet or shoes. Other ornaments can include plastic jewels, charms, pins, buttons, and other decorative accessories.

The assemblage 300 indicates how embodiments of the invention can be used as or to create craft projects. The user can selectively choose desired units and connectors and then connect the elements as described above. In addition, the user can optionally determine to include one or more ornaments in the assemblage. In this manner, a user can create an assemblage of their own personal design.

According to another aspect of the invention, a kit including a plurality of decorative accessory units, connectors, and/or ornaments (collectively referred to here as elements) can be provided. Kits can include a number of elements sufficient for creating one or more decorative assemblages. A kit generally includes a variety of elements so that the user has a choice of elements to use. Some kits comprise elements having a common theme. Such themes can be, for example, color-based, subject-based, or demographically oriented. For example, a demographically themed kit can include decorative accessory elements relating to a particular age group, such as young children can be grouped. Ornaments can be included in kits, and/or may be made separately available. Moreover, users can acquire ornaments currently available and adapt them for use with embodiments of the invention.

While dimensional information has been provided, the embodiments of the invention are not limited to those specifically stated and the various pieces may be larger or smaller than those described.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations, which fall within the spirit and broad scope of the invention.

What is claimed is:

1. A decorative accessory assemblage comprising:
a plurality of individual, flexible decorative units, each unit comprising a generally planar, single decoratively-shaped body having front and rear surfaces and at least two fixed linking ends protruding from the body, each linking end having at least one stretchable connection aperture passing therethrough wherein each aperture for each individual unit lies within the same plane; and
one or more than one piece connector element linking each of the individual decorative units to form the assemblage, each connector element being installed within one or more of the stretchable connection apertures of a first one of said decorative units and one or more of the stretchable connection apertures of a second one of said decorative units, such that each connector element engages a linking end of the first decorative unit with a linking end of the second decorative unit.

2. The decorative accessory assemblage of claim 1, wherein the body of the decorative units includes an aperture configured to receive an ornament.

3. The decorative accessory assemblage of claim 1, wherein the linking ends comprise a strap operatively coupled to the rear surface of the body.

4. A kit for a personal accessory craft project comprising:
a plurality of decorative accessory units, each unit comprising a generally planar, flexible single body having front and rear surfaces and at least two fixed linking ends protruding from the body, each linking end having at least one stretchable connection aperture passing therethrough wherein each aperture for each individual unit lies within the same plane; and
a plurality of one piece connector elements installable within one or more of the stretchable connection apertures of a first one of said decorative accessory units and one or more of the connection apertures of a second one of said decorative accessory units, such that each connector element engages a linking end of the first decorative accessory unit with a linking end of the second decorative accessory unit thereby coupling successive decorative accessory units.

5. The kit of claim 4, wherein the included individual decorative accessory units are interrelated under a common theme.

6. The kit of claim 5, wherein the common theme is a color based theme.

7. The kit of claim 5, wherein the common theme is a demographically oriented theme.

8. The kit of claim 5, wherein the included individual connector elements share the common theme.

9. The kit of claim 4, further comprising a plurality of ornaments wherein an ornament may be coupled to a decorative accessory unit.

10. The kit of claim 4, wherein the linking ends comprise a strap operatively coupled to the rear surface of the body.

* * * * *